(12) United States Patent
Frazier

(10) Patent No.: US 8,339,294 B2
(45) Date of Patent: Dec. 25, 2012

(54) ILLUMINATING PRIMARY AND ALTERNATE KEYBOARD SYMBOLS

(75) Inventor: Jason L. Frazier, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1173 days.

(21) Appl. No.: 12/042,729

(22) Filed: Mar. 5, 2008

(65) Prior Publication Data

US 2009/0224947 A1    Sep. 10, 2009

(51) Int. Cl.
   *H03M 11/00*    (2006.01)
(52) U.S. Cl. ............... 341/34; 341/20; 341/22; 345/156; 345/168; 345/169; 345/170; 200/310; 200/313; 200/314; 361/679.2
(58) Field of Classification Search ............. 341/20, 341/22, 34; 345/156, 168–170; 200/310, 200/313–314; 361/679.2
   See application file for complete search history.

(56) References Cited

U.S. PATENT DOCUMENTS

| | | | | |
|---|---|---|---|---|
| 5,408,060 | A * | 4/1995 | Muurinen | 200/314 |
| 5,950,809 | A | 9/1999 | Andre | 200/314 |
| 6,179,432 | B1 * | 1/2001 | Zhang et al. | 362/84 |
| 6,608,271 | B2 * | 8/2003 | Duarte | 200/311 |
| 6,704,004 | B1 | 3/2004 | Ostergard et al. | 345/170 |
| 7,027,037 | B2 * | 4/2006 | Dowd | 345/170 |
| 7,129,930 | B1 * | 10/2006 | Cathey | 345/168 |
| 7,193,536 | B2 | 3/2007 | Shipman | 341/31 |
| 7,206,599 | B2 | 4/2007 | Lemley | 455/550.1 |
| 2003/0038785 | A1 * | 2/2003 | Suzuki et al. | 345/168 |
| 2003/0202339 | A1 * | 10/2003 | Oross et al. | 362/33 |
| 2005/0057916 | A1 * | 3/2005 | Yu et al. | 362/84 |
| 2005/0073446 | A1 * | 4/2005 | Lazaridis et al. | 341/22 |
| 2005/0190160 | A1 | 9/2005 | Wang et al. | 345/168 |
| 2005/0196215 | A1 * | 9/2005 | McLoone et al. | 400/477 |
| 2005/0286953 | A1 * | 12/2005 | Griffin | 400/486 |
| 2006/0037848 | A1 * | 2/2006 | Kobayashi | 200/310 |
| 2006/0245808 | A1 | 11/2006 | Salman et al. | 400/490 |
| 2006/0285309 | A1 | 12/2006 | Yu et al. | 362/84 |
| 2007/0024588 | A1 * | 2/2007 | Yin et al. | 345/168 |
| 2007/0296706 | A1 * | 12/2007 | Wang et al. | 345/170 |

OTHER PUBLICATIONS

Logisys KB609 Office, Internet and Multimedia Pro Character-Illuminated Keyboard [online]; 2 pp url: http://hi-techreviews.com/reviews_2006/KB609/P2.htm.
Touchless Technology [online]; 2 pp url: http://www.tertiumtechnology.com/touchless_en.php.
Revoltec Lightboard x12 [online]; 2 pp url: http://www.melesoft.com/proddetail.asp?prod=4260048813161.
Flexiglow Illuminated Multimedia Keyboard [online]; 3 pp url: http://www.atruereview.com/keyboard/index.php.

* cited by examiner

*Primary Examiner* — Jared Fureman
*Assistant Examiner* — Alfonso Perez Borroto
(74) *Attorney, Agent, or Firm* — Merchant & Gould, P.C.

(57) ABSTRACT

A keyboard or keypad which can highlight symbols on the keys by illuminating them. The keys are backlit by two light sources, one visible and one ultraviolet, each of which illuminates multiple keys. One symbol on each key is designed to transmit the visible light, becoming highlighted when the visible light source is activated. A second symbol on each key is designed to fluoresce when illuminated by ultraviolet light, becoming highlighted when the ultraviolet light source is activated. If desired, both light sources can be activated, highlighting both symbols simultaneously. If desired, complementary light color and filter material may be used to reduce or eliminate transmission of light through the second symbol. A single pair of light sources may be used for the entire keyboard or the keyboard may be divided into segments with separate light sources for each segment.

17 Claims, 8 Drawing Sheets

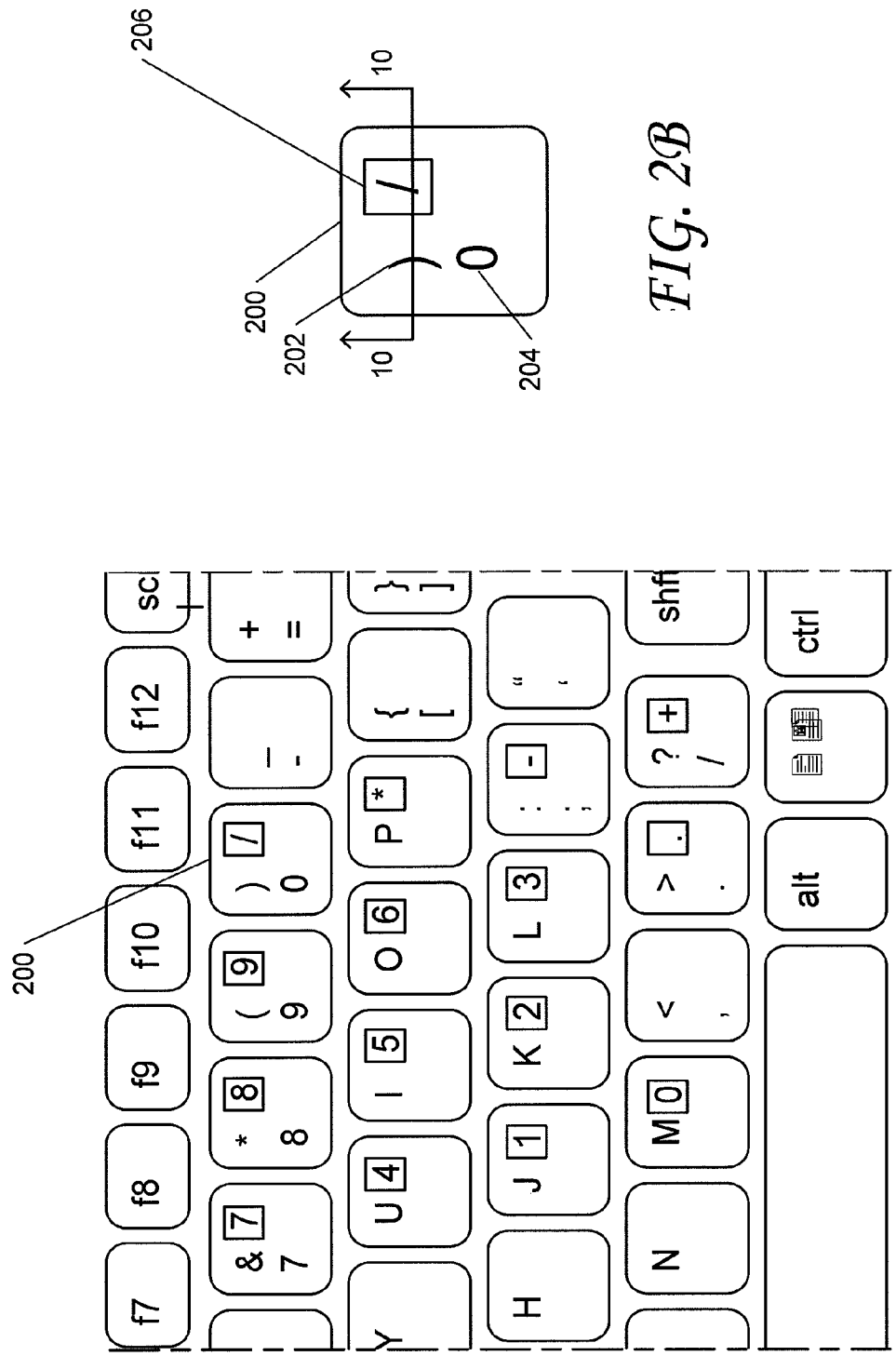

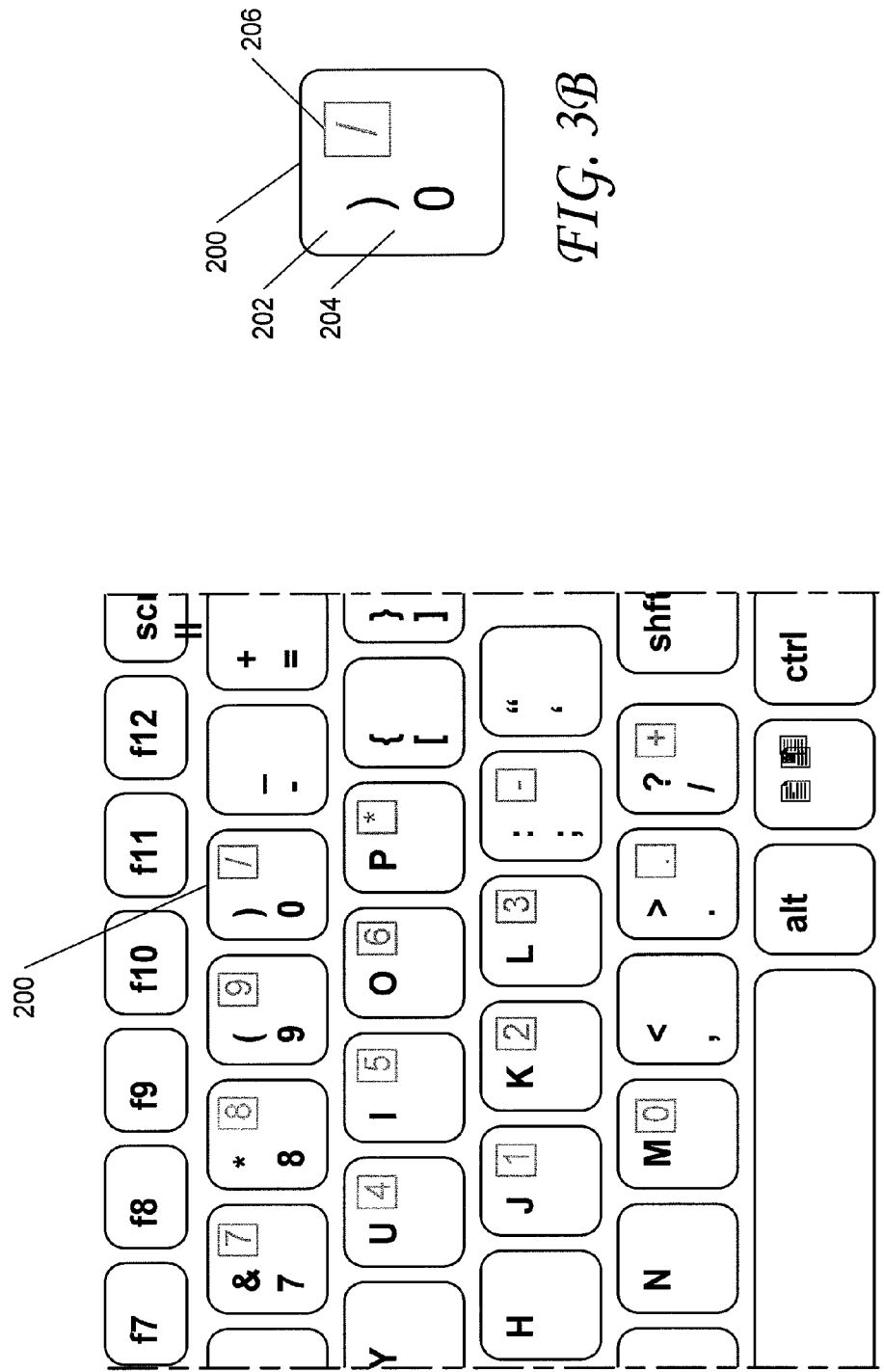

ILLUMINATING PRIMARY AND ALTERNATE KEYBOARD SYMBOLS

BACKGROUND

Electronic devices presently on the market are more frequently providing keyboards or keypads which support alternate input functions such as key chording, multiple input methods, different physical orientations, etc. This results in part from devices becoming physically smaller while at the same time they are adding support for additional functionality.

Typically these alternate input functions are indicated through the use of additional symbols on the keys. As a result, the keys on these devices are often difficult to read. One reason is the visual clutter which results from having multiple symbols on each key and crowding the keys closer together. Another reason is that the size of the symbols themselves are reduced to allow them to fit on the keys. These problems are compounded as smaller devices drive the use of smaller keys. Even when the symbols can be read, there may be user confusion as to which set of symbols is applicable to the function for which the device is currently being used.

It is helpful to visually emphasize one set of symbols over the others so that the appropriate set of symbols is more readily apparent to the user. One method of doing so is to illuminate the set of symbols which is to be emphasized.

One method of providing for separate illumination of separate symbols sets is to provide discrete illumination for each symbol on each key. The illumination may be a separate light source, such as an LED, or a light pipe which directs light from a remote source to the key. Both approaches require a separate physical device (i.e. LED or light pipe) for each symbol requiring illumination. With plural symbols per key, this results in a greater number of light sources than there are keys on the keyboard. Of necessity, these light sources must be smaller than the keys themselves, at least at the interface to the key. Where the light source is relatively bulky, it limits how small the device can be made. Where the light source can be made sufficiently small to not drive the size of the device larger, the light source may become fragile due to reduced component sizes. Light sources capable of providing the requisite lighting levels on an individual key basis may also consume a large amount of the available power relative to the rest of the device.

Exemplary devices to which the present disclosure is relevant include computer keyboards; calculator keypads; remote controls for televisions and stereos; kitchen appliances such as microwave ovens; mobile communication devices and PDAs; mobile and automotive media player devices; and converged mobile devices which combine two or more of these functions.

SUMMARY

This Summary is provided to introduce in a simplified form a selection of concepts that are further described below in the Detailed Description. This Summary is not intended to identify key features or essential features of the claimed subject matter, nor is it intended to be used to limit the scope of the claimed subject matter.

Various aspects of the subject matter disclosed herein are related to illuminating the keys of a keyboard or keypad from behind with two separately controllable light sources: one visible, and one ultraviolet. At least some keys on the keyboard will have two different symbols. One will be designed to transmit the visible light. The other will be designed to fluoresce when illuminated by the ultraviolet light source.

Other aspects relate to using a colored light source and a complementary colored filter in the symbols which fluoresce when exposed to ultraviolet light. This blocks, or substantially reduces the amount of visible light transmitted by those symbols.

Still other aspects of the invention relate to dividing the keyboard into distinct segments and providing separate visible and ultraviolet light sources for each so that the keys making up a segment can be separately highlighted.

A more complete appreciation of the above summary can be obtained by reference to the accompanying drawings, which are briefly summarized below, to the following detailed description of present embodiments, and to the appended claims.

BRIEF DESCRIPTION OF THE SEVERAL VIEWS OF THE DRAWINGS

FIG. 2A is a detailed view of a segment of the keyboard of FIG. 1 illustrating an exemplary set of keys having plural symbol sets.

FIG. 2B is a detailed view of a single key shown in FIG. 2A.

FIG. 3A is a detailed view of a segment of the keyboard of FIG. 1 illustrating an exemplary set of keys having plural symbol sets with a first set of symbols illuminated.

FIG. 3B is a detailed view of a single key shown in FIG. 3A.

DETAILED DESCRIPTION

Overview

This detailed description is made with reference to the accompanying drawings, which form a part hereof, and which show, by way of illustration, specific exemplary embodiments. These embodiments are described in sufficient detail to enable those skilled in the art to practice what is taught below, and it is to be understood that other embodiments may be utilized and that logical, mechanical, electrical, and other changes may be made without departing from the spirit or scope of the subject matter. The following detailed description is, therefore, not to be taken in a limiting sense, and its scope is defined only by the appended claims.

The concepts of the present disclosure are applicable to a variety of keyboards, keypads, and similar devices. Herein, the disclosure is presented primarily with respect to a computer keyboard. This is an exemplary application and not a limiting application. Cellular telephones, personal digital assistants (PDAs); remote controls, mobile audio devices; and a wide range of other devices which use keys for input are contemplated as being in the scope of the disclosure. Herein, the term keyboard is intended to also encompass keypads and similar devices.

Figure 1:
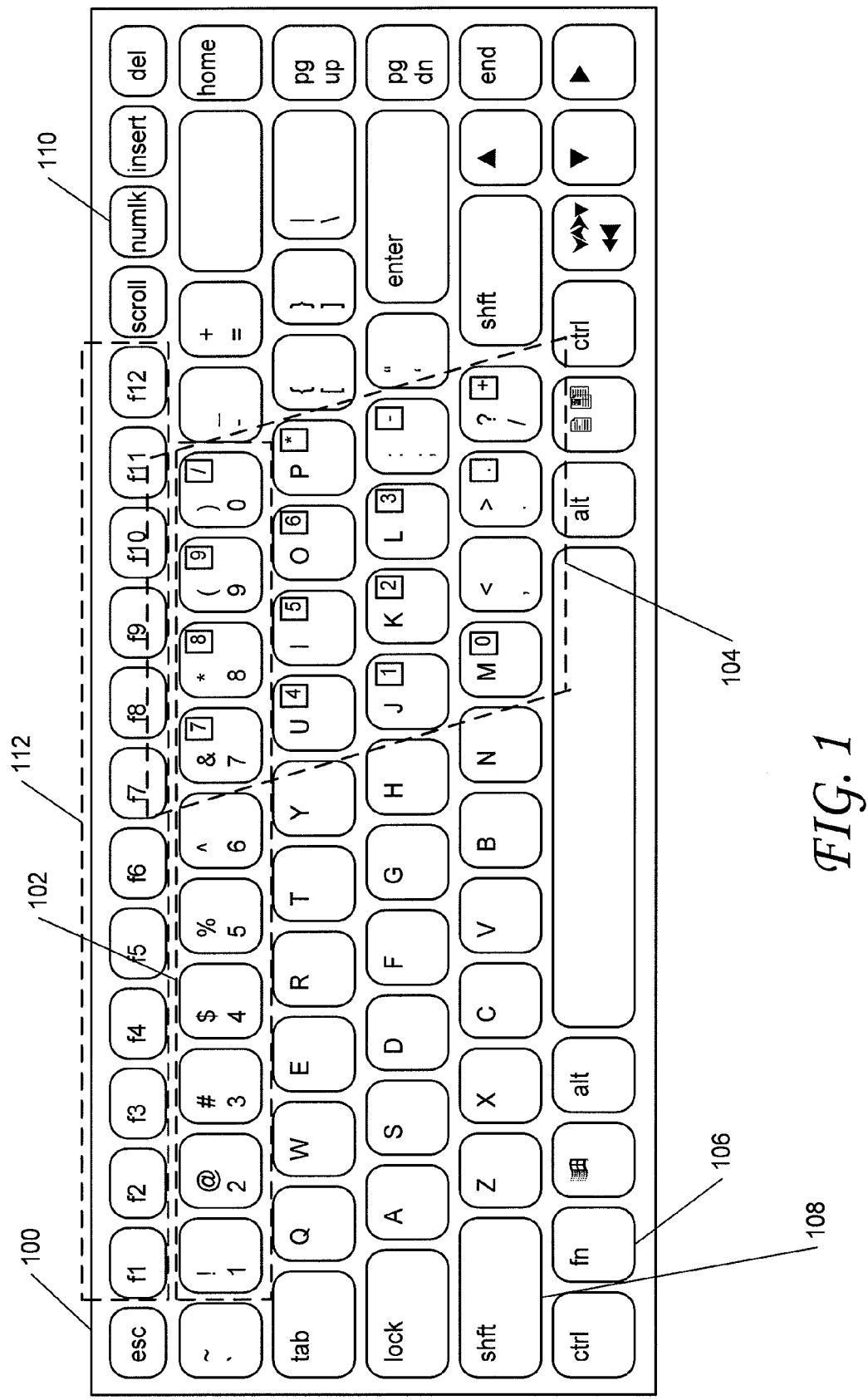
FIG. 1 illustrates an exemplary keyboard with certain keys having plural symbol sets.

FIG. 1 presents a simplified diagram of an exemplary computer keyboard 100. As is typical it comprises a variety of types of keys including alphanumeric, function, and navigation keys among others. Region 102 is a subset of the keys which is often referred to as the "number keys". These keys provide a simple example of keys which have dual symbol sets. When the shift key 108 is not activated, these keys are used to type the digits 1-9 and 0. With the shift key 108 pressed, they are used to input a set of special characters. In certain situations, it may be desirable to provide a visual indication, herein "highlighting," of which function they are performing.

Region 104 of the keyboard illustrates a slightly more complex example of keys which have been "overloaded" with more than one function. In a typical approach to keyboards for laptop computers, there is not a separate keypad for numeric input as is available in a conventional full sized keyboard. Instead, this region of the main keyboard can be used as a numeric keypad by activating a "number lock" (NumLock) key 110 which alters the functionality of a subset of the keys. As above, it may be desirable to provide a visual indication of which function these keys are performing.

Clearly, these concepts can be extended to other devices with overloaded input keys. A cellular telephone may provide a conventional telephone numeric keypad for use in dialing, but use the same keys for alphanumeric input for text messaging or as function keys to control a built-in audio player. A car stereo may use a single set of buttons to select radio stations while in radio mode and to select tracks and/or CDs when in compact disc mode. These and other applications are merely other applications of the key overloading concepts discussed herein with respect to the computer keyboard.

Figure 6:
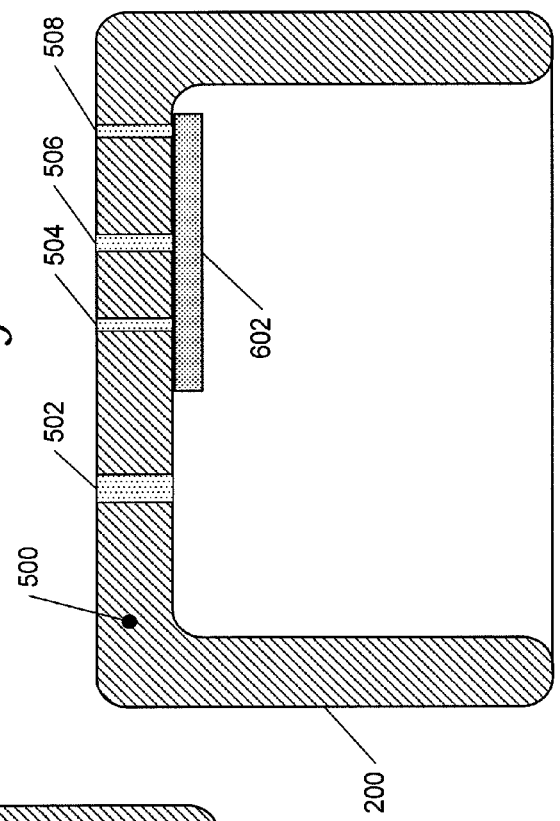
FIG. 6 is a cross section through the key illustrated in FIG. 2B showing an exemplary filter layer.
Figure 5:
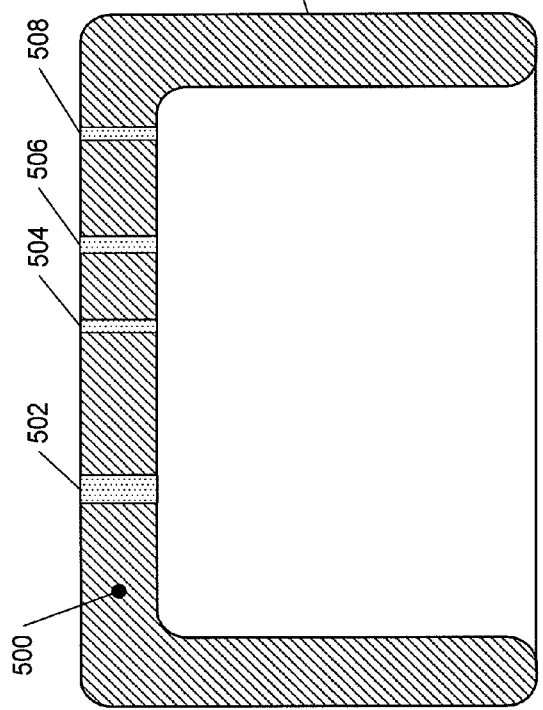
FIG. 5 is a cross section through the key illustrated in FIG. 2B

Referring to FIGS. 2A and 2B, the overloaded keys which are usable as a numeric keypad, and one key in particular, can be seen in more detail. With NumLock key 110 off, these keys behave as a part of the standard keyboard. With NumLock key 110 on, they act as a numeric keypad. Key 200 is representative of the overloaded functionality. With NumLock key 110 off, and the shift key 108 not depressed, key 200 provides for typing the zero character "0" as indicated by symbol 204. With NumLock key 110 off, and the shift key 108 depressed, key 200 will type a closing parenthesis ")" as indicated by symbol 202. With NumLock key 110 on, key 200 becomes the upper right key of a numeric keypad, providing the division function "/" as indicated by symbol 206. Two different cross-section views of key 200 along line 10-10 are shown in FIGS. 5 and 6.

Referring to FIGS. 3A and 3B an exemplary highlighting scheme can be seen. In this scheme, symbols 202 and 204 are considered to be a part of a first symbol set, those used on the conventional keyboard, and are highlighted (depicted in bold to represent highlighting) in combination along with the equivalent symbols on related keys. Symbol 206 is considered to be a part of a second symbol set, those used for the numeric keypad, which can be highlighted independently of the first set (depicted in gray scale to represent non-highlighting). As illustrated, highlighting the symbols of the conventional keyboard makes them more easily distinguished from the overloaded symbols for the keypad.

Figure 4B:
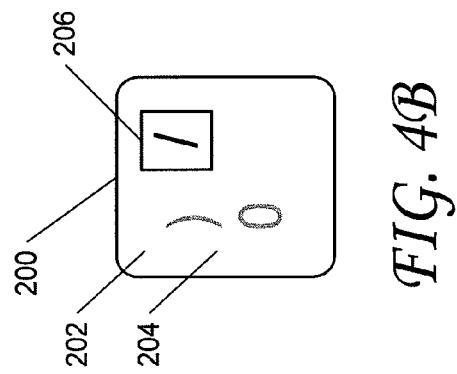
FIG. 4B is a detailed view of a single key shown in FIG. 4A.
Figure 4A:
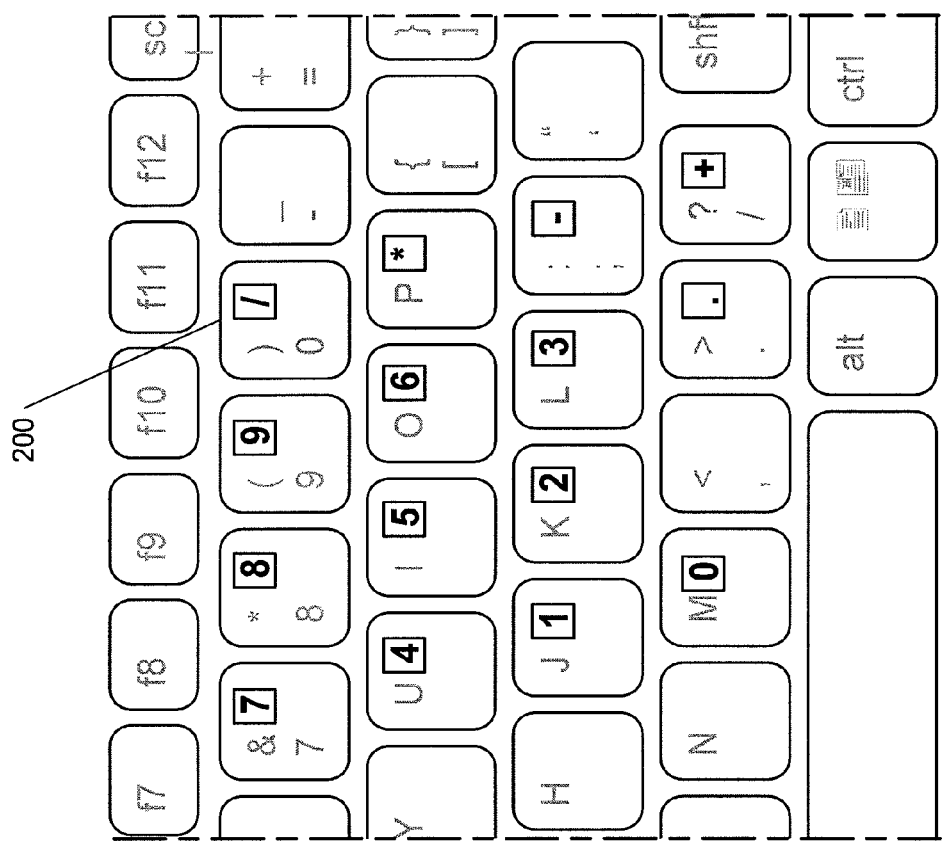
FIG. 4A is a detailed view of a segment of the keyboard of FIG. 1 illustrating an exemplary set of keys having plural symbol sets with a second set of symbols illuminated.

FIGS. 4A and 4B illustrate the same highlighting scheme as FIGS. 3A and 3B with the highlighting reversed. With the symbols of the numeric keypad, such as symbol 206, highlighted (shown highlighted in bold), they become easily distinguished from the symbols of the conventional keyboard (shown non-highlighted as gray scale).

Keyboard Structure and Materials

FIG. 5 illustrates an exemplary technique for constructing an individual key according to the concepts of the present disclosure. The body 500 of the key 200 is constructed of a substantially opaque material such as a dark plastic. The symbols, 202-206 in FIG. 2B, are formed by portions 502-508 of the key 200 which are capable of transmitting at least some light. These portions may be either transparent or translucent as desired. In the illustrated cross section, portion 502 corresponds to symbol 202 and portions 504, 506, and 508 to symbol 206.

In an exemplary embodiment, symbols 202 and 204 and all related symbols in the first symbol set will be formed of a light transmitting material adapted to pass visible light. These symbols will then be highlighted when lit from below by a visible light source 510. Symbol 206, and all related symbols in the second symbol set, will be formed of a light transmitting material which is adapted to fluoresce when excited by a non-visible light source such as ultra-violet (UV) light source 512. Thus, when the UV light source is active, the light will be transmitted by symbols 202 and 204 but will not cause the symbol to be highlighted because the light is not visible to the user. However, the UV light will cause symbol 206 to fluoresce, emitting visible light which will highlight the symbol to the user.

Where the material used for symbol 206 is uncolored, the visible light source 510 will also highlight symbol 206. An alternative embodiment is to use a colored material which is complementary to the visible light source 510. One exemplary embodiment is to use a blue light source and a translucent yellow material for symbol 206. The yellow material will filter most or all of the blue light with the result that the symbol will not be highlighted by the visible light source 510. Another exemplary approach is to overlay or coat the fluorescent symbol with a colored filter layer.

One exemplary embodiment of the keys, as discussed above, is to form the symbols which are intended to fluoresce of material which itself fluoresces. An exemplary technique is to embed fluorescent powder in a light transmitting material and form the symbols from that material.

Another exemplary embodiment of the keys is illustrated in FIG. 6. In this embodiment none of the material used to form the symbols is fluorescent. Instead a fluorescent material 602 is laid over the symbol which is intended to be highlighted. When the UV light source 512 causes the material to fluoresce, the emitted visible light will pass through the adjacent light transmitting portions 504, 506, and 508 highlighting the symbol to the user. The fluorescent material could overlay either the inner surface, as illustrated, or the outer surface of the key.

Filtering of visible light, as discussed above, can be achieved in two different manners when the overlay embodiment of FIG. 6 is used. One exemplary embodiment is to form the symbol 206 of a colored, but non-fluorescent material so that the symbol itself filters the complementary colored light. Another exemplary approach is to use a colored, fluorescing material for the overlay 602. In this embodiment the overlay provides both the filtering and the fluorescence. This allows all symbols in the key to be formed from the same light transmitting material.

Figure 9:
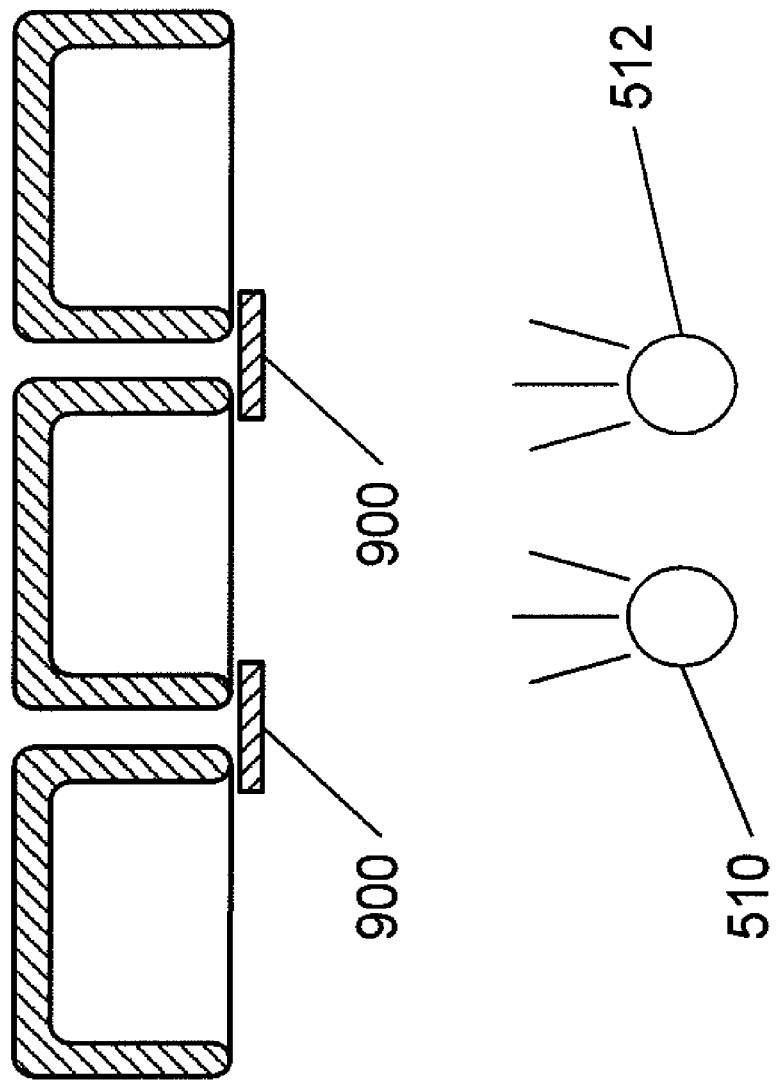
FIG. 9 illustrates a keyboard utilizing masking to block light from escaping between the keys.

Referring to FIG. 9 an exemplary embodiment of the keyboard can be seen which provides masking 900 which blocks light from escaping between the keys. This increases the contrast between the illuminated symbols and the background formed by the keys. This masking may be provided by separate masking material, which could be made of plastic, cardboard, or metal or some other suitable material, which blocks the gap between the keys, as shown, or by configuring the keys so that they block the gap, such as by overlapping the edges of the keys so that one passes beneath the other.

In an exemplary embodiment, the keys are constructed to limit the amount of ultraviolet light which escapes past the keys. In addition to the above masking, the keys will be constructed to block or filter ultraviolet light. The opaque portions of the keys will be constructed of a material which blocks ultraviolet rays. In an embodiment of the type illustrated by FIG. 6 the translucent portions of the keys will utilize material which filters ultraviolet while passing visible light. An embodiment of the type illustrated by FIG. 5 will utilize material which filters enough ultraviolet to ensure that an unacceptable amount of light cannot pass through while allowing enough to penetrate the material so that the fluorescent material will be excited.

Light Source

The use of fluorescent symbols in combination with a UV light source eliminates the need for separate light sources for each symbol. Instead the light sources can be shared across a plurality of keys. The layout of light sources relative to the keys can be tailored to the functionality of the keys and can be balanced against cost and design factors. In all cases, the light sources will be positioned behind, or beneath, the keys so that the keys are backlit.

An exemplary embodiment for a smaller keypad, such as for a cellular phone or PDA, a single light bulb, or LED, for each frequency may be sufficient. Thus a single pair of light sources is sufficient for the entire keypad.

Figure 7:
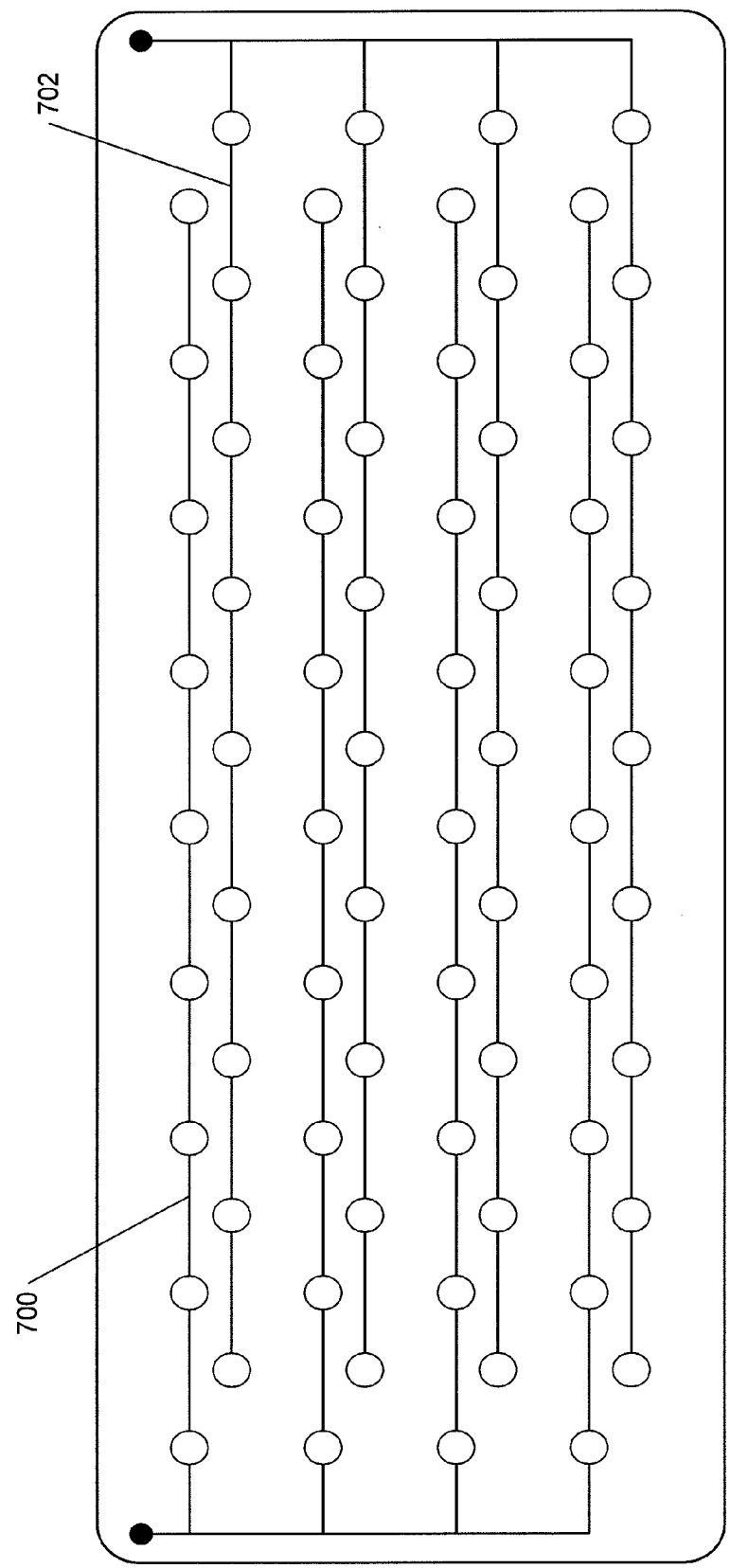
FIG. 7 illustrates an exemplary LED array for illuminating a keyboard having a layout as shown in FIG. 1.

An exemplary embodiment for a larger set of keys, such as a full sized conventional keyboard for a computer, may require multiple light sources, or a broad area light source, in order to provide even illumination across all of the keys. An exemplary broad area light source suitable for use in keyboards and keypads is an LED array but the present disclosure is not specific to that mechanism. Referring to FIG. 7 an exemplary LED array, adapted for use with a keyboard layout such as that shown in FIG. 1, can be seen. Group 700 emits visible light and group 702 emits UV light.

Figure 8:
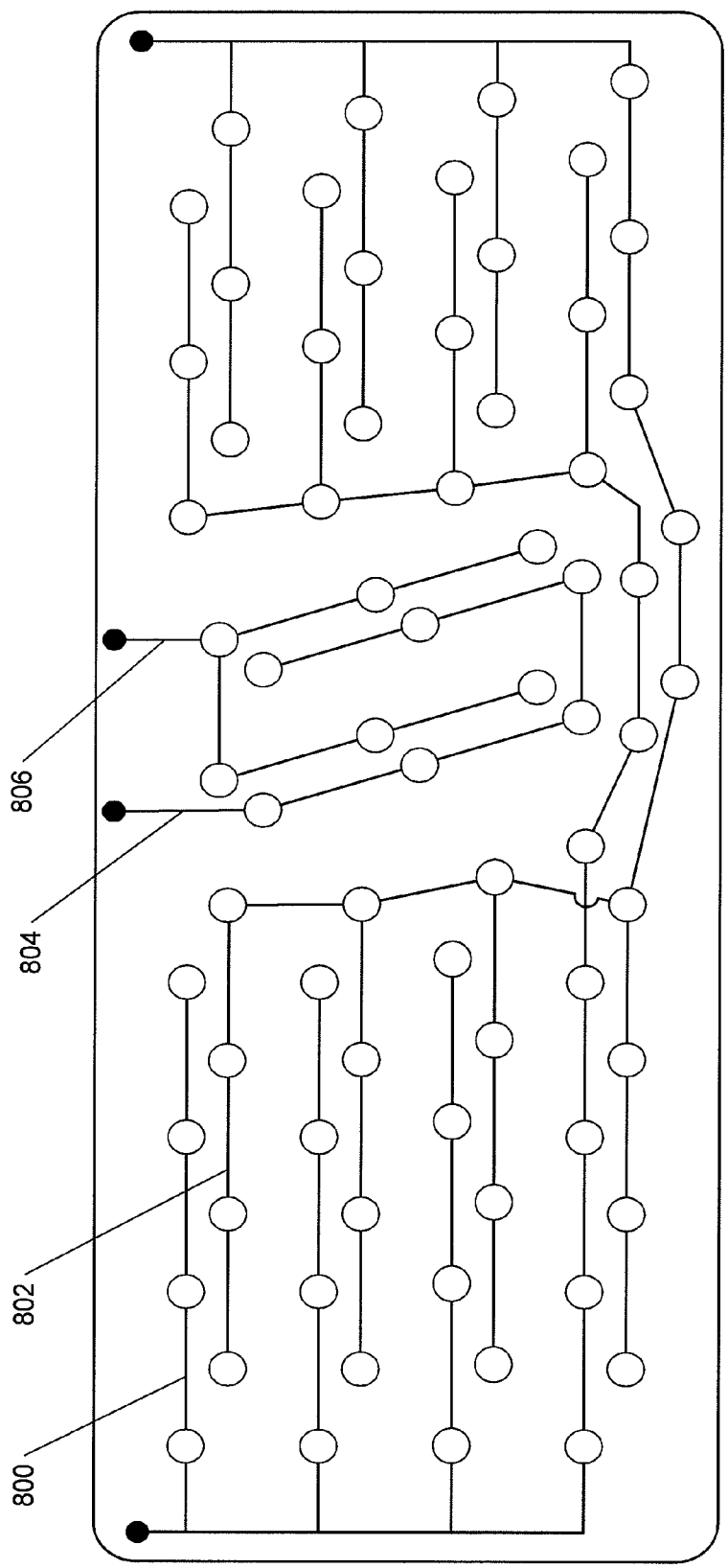
FIG. 8 illustrates an exemplary LED array for illuminating a keyboard having a layout as shown in FIG. 1, with separate lighting capability for the numeric keypad segment.

Another exemplary embodiment for a larger keyboard or keypad is to use 2 or more light sources, of one or both frequencies, to allow greater control over highlighting keys which are used for different functions. Referring to FIG. 1, the region 104 of keys which comprise the numeric keypad, as discussed above, may use a separate set of light sources than the rest of the keyboard. This allows the numeric keypad symbol set to be highlighted without altering the appearance of the remainder of the keys. Referring to FIG. 8, group 804 emits visible light for the numeric keypad, group 806 emits UV light for the numeric keypad, group 800 emits visible light for the remainder of the keyboard and group 802 emits UV light for the rest of the keyboard. Alternatively, a single visible light source of one frequency (i.e. visible light) could be used for the entire keyboard, while separate light sources of the other frequency (i.e. UV) could be used for the numeric keypad and the remainder of the keyboard.

In a similar manner, the top row of keys, the "function" keys 112, may be provided with separate light sources. Because these keys may have a first set of functionality in normal use, and a second set of functionality when the function key ("fn") 106 is depressed it may be desirable to highlight the alternate symbology when the "fn" key is depressed. This configuration could be used as an alternative to one such as that shown in FIG. 8, or in combination with that configuration providing a total of three separately controllable highlighting options. Clearly, additional configurations and combinations thereof are possible.

With two separately controlled light sources available, a total of four modes of operation are available: unlighted—user is dependent upon ambient lighting to see the symbols on the keys; visible light—those symbols which are adapted to pass visible light will be highlighted; UV light—those symbols which fluoresce will be highlighted; and both visible and UV illumination—both symbol sets will be highlighted (such as for low ambient light situations).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood by those skilled in the art that many changes in construction and widely differing embodiments and applications will suggest themselves without departing from the scope of the disclosed subject matter.

What is claimed is:

1. An illuminated keyboard comprising:
   a first plurality of keys each having at least two symbols, a first symbol adapted to transmit visible light and a second symbol adapted to fluoresce when exposed to ultraviolet light, the first plurality of keys associated with a first set of light sources comprising:
   a first visible light source adapted to simultaneously illuminate two or more of the first symbols of the first plurality of keys, and
   a first ultraviolet light source adapted to simultaneously illuminate two or more of the second symbols of the first plurality of keys, wherein the first visible light source and the first ultraviolet light source are activated individually;
   a second plurality of keys each having at least two symbols, a first symbol adapted to transmit visible light and a second symbol adapted to fluoresce when exposed to ultraviolet light, the second plurality of keys associated with a second set of light sources comprising:
   a second visible light source adapted to simultaneously illuminate two or more of the first symbols of the second plurality of keys; and
   a second ultraviolet light source adapted to simultaneously illuminate two or more of the second symbols of the second plurality of keys, wherein the second visible light source and the second ultraviolet light source are activated individually, wherein the second visible light source and the second ultraviolet light source are activated independently of the first visible light source and the first ultraviolet light source, wherein the first set of light sources associated with the first plurality of keys is different from the second set of light sources associated with the second plurality of keys, and wherein the first set of light sources and the second set of light sources illuminate different pluralities of keys.

2. The keyboard of claim 1 wherein the second symbols adapted to fluoresce are formed by embedding fluorescent material within a light transmitting material.

3. The keyboard of claim 1 wherein the second symbols adapted to fluoresce are formed by overlaying fluorescent material on the symbol.

4. The keyboard of claim 3 wherein the overlaying fluorescent material overlays an inner surface of one or more of the first plurality of keys and one or more of the second plurality of keys.

5. The keyboard of claim 1 wherein the first visible light source is adapted to illuminate all of the first plurality of keys simultaneously and wherein the second visible light source is adapted to illuminate all of the second plurality of keys simultaneously.

6. The keyboard of claim 5 wherein the first ultraviolet light source is adapted to illuminate all of the first plurality of keys simultaneously and wherein the second ultraviolet light source is adapted to illuminate all of the second plurality of keys simultaneously.

7. The keyboard of claim 5 wherein the first ultraviolet light source is adapted to illuminate a subset of the first plurality of keys and wherein the second ultraviolet light source is adapted to illuminate a subset of the second plurality of keys.

8. The keyboard of claim 7 wherein the first ultraviolet light source adapted to illuminate a distinct subset of the first plurality of keys.

9. The keyboard of claim 1 wherein the first visible light source emits a light that is substantially of a first color and wherein the second symbols on the first plurality of keys are adapted to filter out light of the first color.

10. A method of highlighting a symbol set on a keyboard having a first plurality of keys and a second plurality of keys, comprising:
providing a first plurality of keys each key having at least two symbols, a first symbol adapted to transmit visible light and a second symbol adapted to fluoresce when exposed to ultraviolet light, the first plurality of keys associated with a first set of light sources comprising:
a first visible light source positioned behind the first plurality of keys that emits visible light; and
a first ultraviolet light source positioned behind the first plurality of keys that emits ultraviolet light;
providing a second plurality of keys each key having at least two symbols, a first symbol adapted to transmit visible light and a second symbol adapted to fluoresce when exposed to ultraviolet light, the second plurality of keys associated with a second set of light sources comprising:
a second visible light source positioned behind the second plurality of keys that emits visible light; and
a second ultraviolet light source positioned behind the second plurality of keys that emits ultraviolet light;
wherein the first set of light sources associated with the first plurality of keys is different from the second set of light sources associated with the second plurality of keys, and wherein the first set of light sources and the second set of light sources illuminate different pluralities of keys; and
whereby activating the first visible light source causes the first symbols of the first plurality of keys to transmit visible light, activating the second visible light source causes the first symbols of the second plurality of keys to transmit visible light, activating the first ultraviolet light source causes the second symbols of the first plurality of keys to fluoresce, and activating the second ultraviolet light source causes the second symbols of the second plurality of keys to fluoresce.

11. The method of claim 10 further comprising a filter for the second symbols of the first plurality of keys which substantially blocks a particular color of light and wherein the first visible light source emits the particular color of light which is blocked by the filter.

12. The method of claim 10 wherein the first visible light source and the first ultraviolet light source are restricted to illuminate only a first region of the keyboard and wherein the second visible light source and the second ultraviolet light source are restricted to illuminate only a second region of the keyboard.

13. An illuminated keyboard comprising:
a first set of plural keys, each key having at least a first symbol and a second symbol, the first symbols and the second symbols defined by an area of light transmitting material disposed within an opaque body, wherein the first symbols are adapted to transmit visible light and the second symbols are adapted to fluoresce when exposed to ultraviolet light, wherein the first set of plural keys is associated with a first set of light sources comprising:
a first visible light source adapted to simultaneously illuminate all of the first set of plural keys, wherein upon illuminating the first visible light source the first symbols of the first set of plural keys transmit visible light; and
a first ultraviolet light source adapted to simultaneously illuminate all of the first set of plural keys, wherein upon illuminating the first ultraviolet light source the second symbols of the first set of plural keys fluoresce, wherein the first visible light source and the first ultraviolet light source are activated separately;
a second set of plural keys, each key having at least a first symbol and a second symbol, the first symbols and the second symbols defined by an area of light transmitting material disposed within an opaque body, wherein the first symbols are adapted to transmit visible light and the second symbols are adapted to fluoresce when exposed to ultraviolet light, wherein the second set of plural keys is associated with a second set of light sources comprising:
a second visible light source adapted to simultaneously illuminate all of the second set of plural keys, wherein upon illuminating the second visible light source the first symbols of the second set of plural keys transmit visible light; and
a second ultraviolet light source adapted to simultaneously illuminate all of the second set of plural keys, wherein upon illuminating the second ultraviolet light source the second symbols of the second set of plural keys fluoresce, wherein the second visible light source and the second ultraviolet light source are activated separately, and wherein the second visible light source and the second ultraviolet light source are activated independently of the first visible light source and the first ultraviolet light source, wherein the first set of light sources associated with the first set of plural keys is different from the second set of light sources associated with the second set of plural keys, and wherein the first set of light sources and the second set of light sources illuminate different sets of plural keys.

14. The keyboard of claim 13 wherein the first visible light source emits a light that is substantially of a specific color and wherein each of the second symbols of the first set of plural keys adapted to fluoresce is further adapted to filter that specific color of light.

15. The keyboard of claim 13 wherein the second visible light source emits a light that is substantially of a specific color and wherein each of the second symbols of the second set of plural keys adapted to fluoresce is further adapted to filter out that specific color of light.

16. The keyboard of claim 13 further comprising masking between the first set of plural keys and the second set of plural keys adapted to block light from passing between the keys.

17. The keyboard of claim 16 wherein the second symbols of the first set of plural keys and the second set of plural keys that are adapted to fluoresce are formed by embedding fluorescent material within a light transmitting material.

\* \* \* \* \*